(12) United States Patent
McLaughlin

(10) Patent No.: US 9,544,377 B2
(45) Date of Patent: Jan. 10, 2017

(54) LOGGING COMMUNICATION EVENTS USING LOCATION INFORMATION

(75) Inventor: Mark McLaughlin, Woking (GB)

(73) Assignee: Skype, Dublin (IE)

(*) Notice: Subject to any disclaimer, the term of this patent is extended or adjusted under 35 U.S.C. 154(b) by 710 days.

(21) Appl. No.: 12/803,800

(22) Filed: Jul. 7, 2010

(65) Prior Publication Data

US 2011/0201313 A1 Aug. 18, 2011

(30) Foreign Application Priority Data

Feb. 12, 2010 (GB) .................................. 1002404.0

(51) Int. Cl.
*H04W 24/00* (2009.01)
*H04L 29/08* (2006.01)
*H04W 4/02* (2009.01)

(52) U.S. Cl.
CPC ............. *H04L 67/18* (2013.01); *H04W 4/02* (2013.01); *H04L 67/22* (2013.01); *H04W 4/025* (2013.01)

(58) Field of Classification Search
CPC ......... H04L 67/18; H04L 67/22; H04W 4/802; H04W 4/023; H04W 4/025; H04W 4/028; H04W 4/04
USPC ............. 455/456.5, 456.6, 456.1–456.3, 457
See application file for complete search history.

(56) References Cited

U.S. PATENT DOCUMENTS

| | | |
|---|---|---|
| 2005/0032527 A1 | 2/2005 | Sheha et al. |
| 2005/0170852 A1* | 8/2005 | Li et al. ..................... 455/456.5 |
| 2005/0261003 A1 | 11/2005 | Fiedler et al. |
| 2008/0194268 A1 | 8/2008 | Koch |
| 2008/0262713 A1* | 10/2008 | Tajima et al. ................. 701/200 |
| 2008/0268874 A1 | 10/2008 | Pizzi |
| 2009/0186628 A1* | 7/2009 | Yonker et al. ............. 455/456.1 |
| 2009/0204899 A1 | 8/2009 | Bennett |
| 2011/0167065 A1* | 7/2011 | Toyoda et al. ................ 707/737 |

FOREIGN PATENT DOCUMENTS

| | | | |
|---|---|---|---|
| CN | 1952682 | 4/2007 | |
| EP | 1 848 184 A1 | 10/2007 | |
| JP | 2008-244531 A | 10/2008 | |
| JP | WO 2009/153862 | * 12/2009 | ............. G09B 29/00 |

OTHER PUBLICATIONS

"Foreign Office Action", CN Application No. 201180009343.9, Aug. 11, 2015, 16 pages.
(Continued)

*Primary Examiner* — Olumide T Ajibade Akonai
(74) *Attorney, Agent, or Firm* — Tom Wong; Micky Minhas

(57) ABSTRACT

A user terminal comprising: a positioning system arranged to detect a geographical location of the user terminal; a transceiver for communicating with other user terminals via a communication network; and a communication processing apparatus coupled to the transceiver and positioning system. The communication processing apparatus is arranged to detect communication events occurring via the transceiver and communication network in relation to other user terminals, and to maintain a log of the communication events. Further, the communication processing apparatus is configured to organize the log in dependence on a geographical location detected by the positioning system.

20 Claims, 4 Drawing Sheets

| Within 1km of here | |
|---|---|
| ⇨ | John Appleseed (Today, 23:06) |
| ⇦ | Jane Doe (Yesterday, 14:33) |
| ⇨ | Alain LaRocque (24th March, 09:51) |
| Within 5km of here | |
| ⇨ | John Appleseed (Yesterday, 17:45) |
| ⇨ | John Appleseed (Today, 23:06) |
| More than 5km from here | |
| ⇦ | Jane Doe (Yesterday, 14:33) |

(56) References Cited

OTHER PUBLICATIONS

"Foreign Office Action", CN Application No. 201180009343.9, Feb. 16, 2016, 7 pages.
"Foreign Office Action", CN Application No. 201180009343.9, May 6, 2014, 13 pages.
"Foreign Office Action", CN Application No. 201180009343.9, Jan. 20, 2015, 8 pages.
European Search Report mailed Jun. 9, 2011, for Application No. GB1002404.0, consisting of 1 page.
International Search Report and the Written Opinion of the International Searching Authority, mailed Jun. 8, 2011, for International Application No. PCT/EP2011/051903, consisting of 9 pages.
"Foreign Notice of Allowance", CN Application No. 201180009343.9, Jul. 25, 2016, 4 pages.

\* cited by examiner

LOGGING COMMUNICATION EVENTS USING LOCATION INFORMATION

RELATED APPLICATION

This application claims priority under 35 U.S.C. §119 or 365 to Great Britain Application No. 1002404.0, filed Feb. 12, 2010. The entire teachings of the above application are incorporated herein by reference.

FIELD OF THE INVENTION

The present invention relates to an event logging mechanism for a user terminal in a communication system.

BACKGROUND

Some communication systems allow the user of a terminal, such as a personal computer or mobile terminal, to conduct voice or video calls over a packet-based computer network such as the Internet. Such communication systems include voice or video over internet protocol (VoIP) systems. These systems are beneficial to the user as they are often of significantly lower cost than conventional fixed-line or mobile networks. This may particularly be the case for long-distance communication. To use a VoIP system, the user installs and executes client software on their terminal. The client software sets up the VoIP connections as well as providing other functions such as registration and authentication. In addition to voice communication, the client may also set up connections for other communication media such as instant messaging ("IM"), SMS messaging, file transfer and/or voicemail.

One type of communication system for packet-based communication uses a peer-to-peer ("P2P") topology. To enable access to a peer-to-peer system, a user executes P2P client software supplied by a P2P software provider on their terminal, and registers with the P2P system. When the user registers with the P2P system, the client software is provided with a digital certificate from a server. This may be referred to as a "user identity certificate" (UIC). Once the client software has been provided with the certificate, then calls or other communication connections can subsequently be set up and routed between end-users ("peers") of the P2P system without the further use of a server in the call set-up. Instead, the client looks up the required IP addresses from information distributed amongst the P2P client software on other end-users' terminals within the P2P system. That is, the address look-up list is distributed amongst the peers themselves. Once the IP address of a callee's terminal has thus been determined, the caller's P2P client software then exchanges UIC certificates with the callee's P2P client software. The exchange of these digital certificates between users provides proof of the users' identities and that they are suitably authorised and authenticated in the P2P system. Therefore the presentation of digital certificates provides trust in the identity of the users.

It is therefore a characteristic of peer-to-peer communication that, once registered, the users can set up their own communication routes through the P2P system in at least a partially decentralized manner based on distributed address look-up and/or the exchange of one or more digital certificates, without using a server for those purposes. Further details of an example P2P system are disclosed in WO 2005/008524 and WO 2005/009019.

VoIP or other packet-based communications can also be implemented using non-P2P systems that do use centralized call set-up and/or authentication, e.g. via a server.

In a communication system it is often useful for the client application to maintain a log of past communication events. This helps improve operation of the network by facilitating continuity in threads of communication. For example a thread could comprise a chain of related communications such as calls or IM sessions between the same two or more users. If one or more communications are postponed or missed, then the log will enable those communications to be more readily identified and therefore the thread of communication can be more efficiently recovered by a user at a later date.

A conventional communication client application provides the user with the ability to retrieve a log of calls that they have made, received or missed. The log may also record other communication events such as IM sessions or voicemail messages. These logs comprise a list of communication events which are typically sorted chronologically and which record the type of call or event that took place, who the call was with, and the time of the event.

SUMMARY

The inventors have recognised that this conventional technique for logging events is not necessarily the most functional or efficient in terms of facilitating continuity in threads of communication.

According to one aspect of the present invention, there is provided a user terminal comprising: a positioning system arranged to detect a geographical location of said user terminal; a transceiver for communicating with other user terminals via a communication network; and a communication processing apparatus coupled to the transceiver and positioning system, arranged to detect communication events occurring via said transceiver and communication network in relation to other user terminals, and to maintain a log of said communication events; wherein the communication processing apparatus is configured to organize said log in dependence on a geographical location detected by the positioning system.

The present invention thus provides an improved logging mechanism which links the physical location of the user terminal to the logged communication events, thereby allowing geographically relevant communication events to be more readily or efficiently identified. One advantageous result of this is to enable a user to more efficiently retrieve and continue a relevant thread of communication.

Preferably said user terminal is a mobile user terminal, and preferably said communication events are in relation to other mobile user terminals.

In particularly preferred embodiments, the communication processing apparatus may be configured to generate an organized set of controls enabling further communication events to be initiated based on the organized log.

Thus the geographical information may advantageously be used to generate controls enabling the user to pick up a geographically relevant thread of communication directly from the log.

To further facilitate the link between a geographic location and a thread of communication, in preferred embodiments the positioning system may be arranged to detect a current geographic location of said user terminal, and the communication processing apparatus may be configured to organize said log in dependence on the current geographical location.

Further, the communication processing apparatus may be configured to capture a geographical location of said user terminal from the positioning system at a respective time of each of said communication events, and to organize said log in dependence on the captured geographical locations.

The communication processing apparatus may be configured to organize said log in dependence on the current geographical location relative to the captured geographical locations.

There are a number of options for detecting the geographical information. For example, said positioning system may comprise a satellite-based positioning system such as a GPS receiver.

Said transceiver may be operable to communicate over a wireless cellular network comprising a plurality of cells each served by a corresponding base station, and the positioning system may be configured to detect said geographical location based on a location of at least one of said base stations.

The positioning system may be configured to detect said position based on a triangulation performed using a plurality of said base stations.

Said transceiver may be operable to communicate over a packet-based network comprising a plurality of wireless access points, and the positioning system may be configured to detect said geographical location based on an identity of one of said wireless access points.

Furthermore, the geographical information may take any of a number of different forms. For example, the communication processing apparatus may be configured to determine a respective distance between the current location of said user terminal and the captured location of each of said communication events, and to organize the log in dependence on said distances.

The communication processing apparatus may be configured to identify one of a plurality of predetermined sites based on said geographical location, and to organize the log in dependence on said identified site.

In a preferred application of the present invention, the transceiver may be configured to communicate via the Internet, said communication events being via the Internet. Said communication events may comprise at least one of a voice call, a video call, a missed call, a voicemail message, and an IM chat message.

According to a further aspect of the invention there is provided a communication system comprising: a first user terminal and a plurality of other user terminals each comprising a transceiver for engaging in communication events between one another over a communication network, wherein at least one of said first terminal and other user terminals is a mobile user terminal comprising a positioning system arranged to detect a geographical location of the respective mobile user terminal, and at least the first user terminal comprises a communication processing apparatus arranged to maintain a log of said communication events; wherein the communication processing apparatus is configured to organize said log in dependence on said geographical location, and to output the organized log to a user of the first user terminal.

According to a further aspect of the present invention, there is provided a method comprising: operating a positioning system to detect a geographical location of a user terminal; operating a processing apparatus to detect communication events occurring between said user terminal and other user terminals via a communication network, and to maintain a log of said communication events; further operating the processing to organize said log in dependence on a geographical location detected by the positioning system.

According to another aspect of the present invention, there is provided a computer program product comprising code embodied on a computer-readable medium and configured so as when executed on a user terminal to: detect a geographical location of said user terminal, detect communication events occurring between said user terminal and other user terminals via a communication network, maintain a log of said communication events, and organize said log in dependence on a geographical location detected by the positioning system.

The system, method and/or computer program may be further configured in accordance with any of the above user terminal features.

BRIEF DESCRIPTION OF THE DRAWINGS

For a better understanding of the present invention and to show how it may be but into effect, reference is made by way of example to the accompanying drawings in which.

DETAILED DESCRIPTION OF PREFERRED EMBODIMENTS

Figure 1:
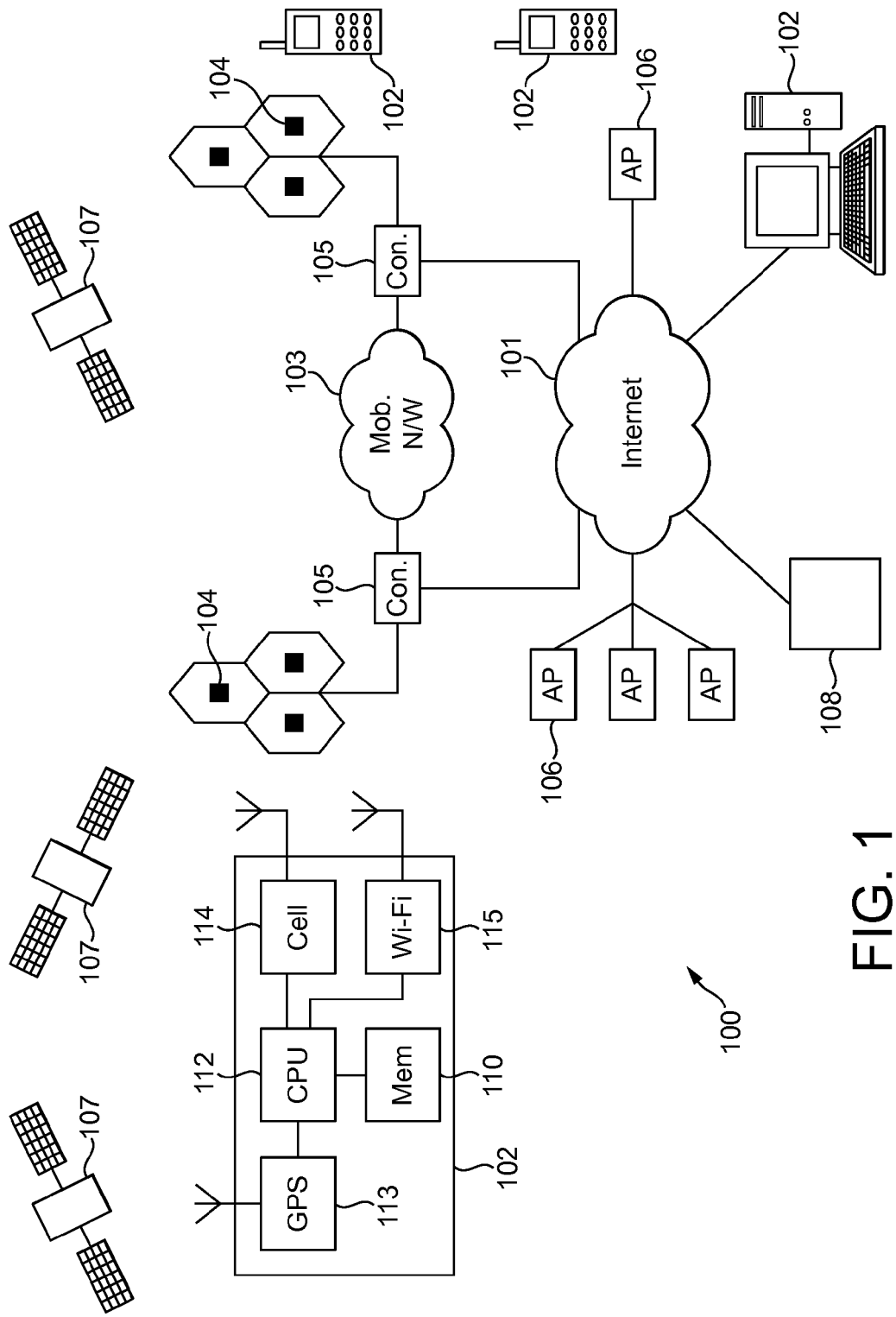
FIG. 1 is a schematic representation of a communication system.

FIG. 1 is a schematic illustration of a communication system 100 comprising one or more communication networks. These may comprise a packet-based network 101 such as the Internet, and a mobile cellular network 103. The mobile cellular network 103 comprises a plurality of base stations 104 (sometimes referred to as node Bs in 3GPP terminology). Each base station 104 is arranged to serve a corresponding cell of the cellular network 103. Further, the packet-switched network 101 comprises a plurality of wireless access points 106 such as wi-fi access points for accessing the Internet. These may be the access points of one or more wireless local area networks (WLANs).

A plurality of user terminals 102 are arranged to communicate over the networks 101 and/or 103. The user terminals 102 may comprise for example desktop PCs, laptop PCs, or other mobile terminals such as mobile phones. Each user terminal 102 comprises one or more transceivers for accessing the one or more networks 101 and/or 103. For example, each user terminal 102 may comprise a cellular wireless transceiver 114 for accessing the mobile cellular network 103 via the base stations 104, and/or a wired or wireless modem 115 for accessing the Internet 101. In the case of a wireless modem, this typically comprises a short-range wireless transceiver (e.g. wi-fi) for accessing the Internet 101 via the wireless access points 106. The cellular and short-range wireless transceivers are typically arranged to operate on radio frequencies (RF), with the cellular wireless transceiver 114 typically being arranged to operate on a licensed RF band and the short-range wireless transceiver 115 being arranged to operate on an unlicensed RF band.

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology, or Radio Network Controllers (RNCs) in USTM or HSPA terminology.

Each user terminal 102 further comprises a memory 110 such as an electronic erasable and programmable memory (EEPROM, or "flash" memory); and a processor 112 coupled to the memory 110, cellular wireless transceiver 114 and short-range wireless transceiver 115. The memory 110 stores communications code arranged to be executed on the processor 112, and configured so as when executed to engage in communications over the Internet 101 and/or cellular network 103. The communications code may comprise signal processing code for transmitting and receiving signals over the wireless cellular network 103 via the cellular wireless transceiver 114 (and/or some or all of this functionality may be implemented in the cellular transceiver 114, though the increasing trend is for at least some of the signal processing to be performed in software). Further, the communications code preferably comprises a communication client application for performing communications such as voice or video calls with other user terminals 102 over the Internet 103, preferably via the short-range wireless transceiver 115 and wireless access points 106; and/or via the cellular wireless transceiver 114, base stations 104 and controller stations 105 of the cellular network 103 as discussed above. However, one or more of the user terminals 102 involved could alternatively communicate via a wired modem, e.g. in the case of a call between a mobile terminal and a desktop PC.

Figures 2, 3:
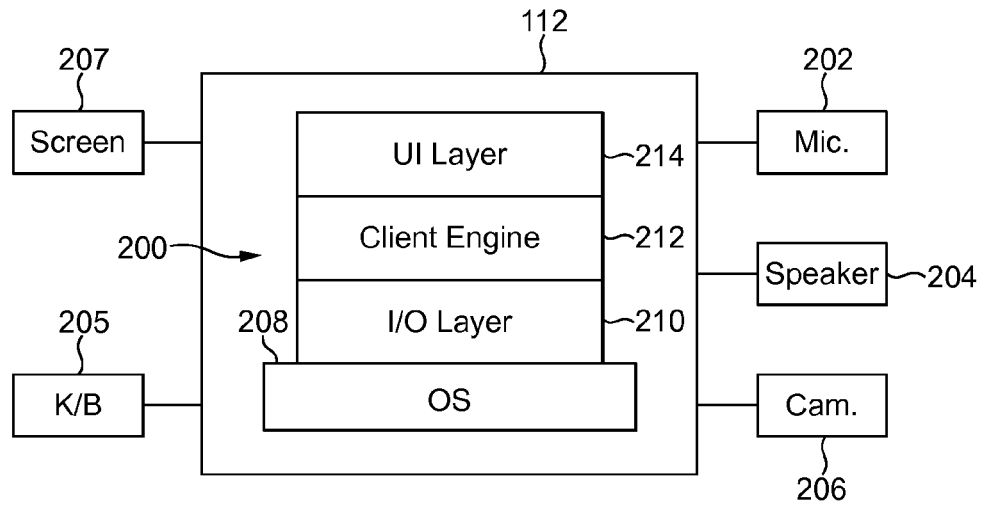
FIG. 2 is a schematic block diagram of a communication client on a terminal.
FIG. 3 is an illustration of a part of a user interface.

Further details of an exemplary user terminal 102 are illustrated in FIG. 2. Here the processor 112 is shown executing a communication client application 200 running on an operating system (OS) 208 (the operating system loads the client application 200 from memory 110 and if necessary schedules the client 200 in order to share the processor's execution time with and any other software such as the cellular signal processing code). The client application 200 comprises a protocol stack having an I/O layer 210, client engine 212 and UI layer 214 (from lower to higher layers respectively). As shown, the processor is coupled to user input devices such as a keyboard 205, microphone 202 and webcam 206; and to user output devices such as a screen 207 and speaker 204.

The I/O layer 210 comprises a voice engine for encoding speech signals from the microphone 204 for transmission over the Internet 101, and decoding encoded speech signals received over the Internet 101 for playback through the speaker 204. The I/O layer 210 also comprise a video engine for encoding video signals from the webcam 206 for transmission over the Internet 101, and decoding encoded video signals received over the Internet 101 for playback through the screen 207. These speech and video signals typically take the form of live voice and video streams encoded and decoded as part of an ongoing call. The I/O layer 210 further comprises a control signalling protocol for transmitting and receiving other signals over the Internet 101.

The client engine 212 is responsible for call set-up. In particularly preferred embodiments the communication client application 200 is a peer-to-peer (P2P) client, as discussed above. In that case the client engine 212 is configured to perform a registration with a server 108, and to receive back a UIC certificate in response. The client engine 212 will then be configured to look up an IP address of a contact 102 from a database distributed amongst other peers 102, to exchange UIC certificates with the desired contact, and to thereby establish a communication connection such as a voice or video call with the contact in question. In other embodiments however, the client engine 212 could be arranged to perform a more centralized call set-up involving authorisation and/or address look-up via a centralized server. Either way, the client engine 112 may be further configured to perform other functions such as connection management, retrieving and storing profile information on a server 108, and exchanging presence information with contacts 102 (presence gives information about another user's availability, and is preferably defined at least in part by that user themselves). The client engine 212 controls the I/O layer 210 to perform the required signalling for the above functions.

The UI layer 214 is then responsible for displaying information and controls to the user on screen 207, including the log, and for receiving user inputs via the keyboard 205 or mouse (not shown). Based on the user inputs, the UI layer 214 controls the client engine 212 to perform the required functions.

Returning to FIG. 1, at least some of the user terminals 102 are additionally equipped with a positioning system 113, coupled to the processor 112. This preferably takes the form of a satellite-based positioning system such as a GPS receiver, configured to detect the geographical location of its respective user terminal 102 by reference to a plurality of satellites 107 according to techniques known in the art.

In other embodiments, the positioning system 113 could alternatively or additionally comprise a cellular positioning system in the form of cellular positioning code stored on the memory 110 and arranged for execution on the processor 112. In that case, the cellular positioning code is arranged to detect the location of the user terminal 102 by reference to one or more base stations 104. This can be achieved crudely by identifying the location of the base station 104 which is currently serving the user terminal 102, or more accurately by identifying the location of a plurality of nearby base stations 104 and performing a triangulation. In the latter case, the triangulation works by detecting the time for a signal to travel between the user terminal 102 and each of the respective base stations 104. The detection could be performed by the cellular positioning system 113 running on the user terminal 102 itself, or could be performed by a controller station 105 and then signalled to the positioning system 113 running on the user terminal 102.

Another option is for the positioning system 113 to comprise code configured to detect the position of the respective user terminal 102 by reference to the location of a wireless access point 106.

In the case of detecting the location by reference to one or more base stations 104 or to a wireless access point 106, the preferred option is for the positioning calculation (e.g. the triangulation) to be taken care of on a host terminal of the respective network 103 or 101 (e.g. on a cellular controller station 105 or a server in communication with the wireless access point 106). The positioning system on the user terminal 102 would then comprise a suitable programming interface for retrieving the location information from the host terminal. However, the option of the user terminal 102 performing its own positioning calculation by reference to the one or more base stations 104 or wireless access point 106 is not excluded, e.g. by performing its own cell triangulation.

Whatever form the positioning system 113 takes, note that it is configured to detect the geographical location of its own respective user terminal 102. That is to say, by means of a measurement or determination process that is at least partially automated, rather than location information simply being entered manually at the respective user terminal 102 for example.

The positioning system 113 is configured to output an indication of the detected geographical location to the UI layer 214 of the client application 200 via a suitable protocol in the I/O layer 210. The geographical location as detected by the positioning system 113 can take a number of forms. In satellite-based systems such as GPS or in cellular-based triangulation techniques, the positing system 113 is may be arranged to detect geographical coordinates for output to the client application 200. The client application 200 may then interpret the coordinates, e.g. by determining the radius from some other point, and/or by mapping the coordinates to one of a predetermined set of possible geographical sites such as "home", "office", "pub", etc. The set may be defined by the user, e.g. by teaching the client application 200 a name or title of the site whenever first visited with the user terminal 102 in question. Alternatively the human-readable name of the site may be retrieved via an interface to a third-party geocoding service over the Internet 101. For example the user terminal 102 may supply its WGS84 coordinates, and the geogoding service would automatically return a "friendly" name based on those co-ordinates. This would allow the user interface to create more meaningful groupings such as "Wokingham", "Berkshire" or "near Superco supermarket" depending on the granularity of the location data available.

In alternative embodiments, the geographical location as detected by the positioning system 113 could take the form of an indication of one of a plurality of possible geographical regions based on the identity of the base station 104 or access point 106 to which its respective user terminal 102 is currently connected—e.g. an indication of the cell or WLAN in which the user terminal 102 is currently found. The positioning system 113 would then output this indication to the client application 200, which may then interpret it by mapping the indication to one of a predetermined set of possible sites such as "home", "office", "pub", etc. Again the set could be trained or the names could be accessed online from a geocoding service. Another option would be use the geographical coordinates of the base station 104 or access point 106 as an approximation of the location of the user terminal 102.

In another alternative embodiment, if the location of the user terminal 102 is detected by reference to one or more base stations (e.g. by triangulation) or by reference to a wireless access point 106, and if the positioning calculation is performed by a host terminal such as a cellular controller station 105 or a server connected to 106, then the geographical location as detected by the positioning system 113 could directly take the form of the human-readable name of the geographical site. That is to say, the host calculation and geocoding service could be combined such that the positioning system 113 can directly retrieve the name of its current geographical site from the service, rather than having to first retrieve its coordinates or cell identity and then separately look-up the human-readable name.

The client application 200 then uses the interpreted location information from the positioning system 113 to sort and search a communication event history log, e.g. comprising call history and/or IM chat history. In one embodiment location information for predefined locations may be used to sort calls made from predefined areas, e.g. school, home and work. In an alternative embodiment of the invention the distance the call was made relative to the user's current location may be used to sort and search for calls.

This "location enabled" call log allows users to view their calls not only by who the call was with when the call took place—but also where they were when those calls took place. The present invention thus allows the user to search a call history to quickly identify calls made in a particular location. In one embodiment of the invention the user's location is automatically used as search criteria such that the user does not need to input a search location.

In particularly preferred embodiments, the invention has two parts. The first is the capture of location data when logging calls or other events (i.e. capturing the location of the user terminal 102 at the time of the call or event). The second is the organization and output of the captured location data, which is preferably based on the current location of the user terminal 102.

To capture, when any type of call or other event occurs, be it incoming, outgoing or a missed call, the following attributes are preferably recorded:
  The local time when the event occurred
  The contact with whom the event took place with
  If an active call took place, the duration of the event
  The location of the user terminal 102 when the event took place The location data will primarily be used on terminals 102 that are portable, and have GPS or other co-ordinate based location API's that are available to third-party developers (such as those that reference locations of wireless networks as discussed above). The location could be stored for example as WGS84 co-ordinates (e.g., 51.0000, 0.5200).

With regard to the subsequent organization of the log based on the captured data, the following examples demonstrate a number of ways of processing and outputting the data.

FIG. 3 shows an example in which the call log is sorted by proximity to the current physical location of the user terminal 102. That is to say, the current location of the user terminal 102 relative to its previous own location at the time of the event.

Figure 4:
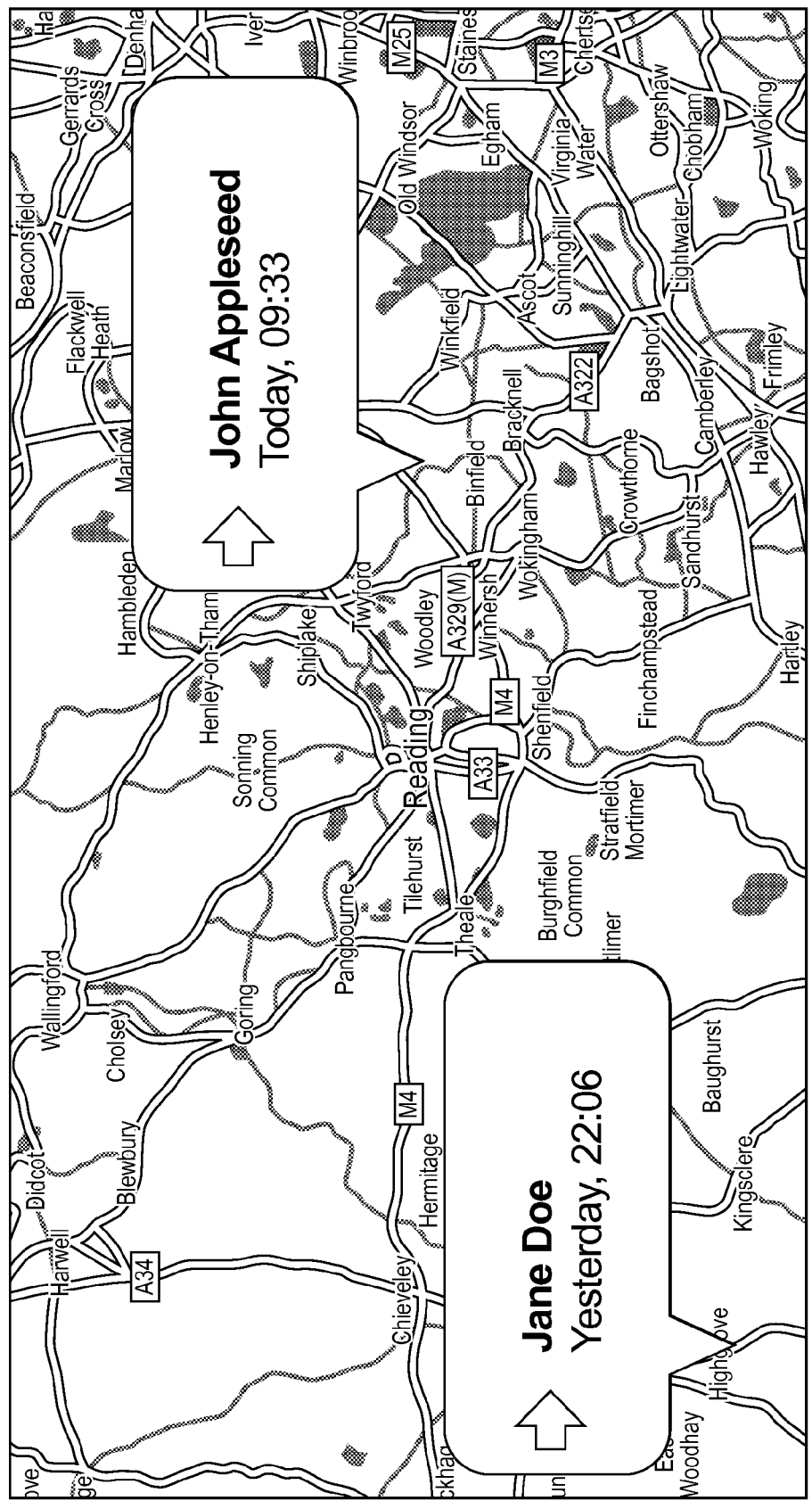
FIG. 4 is another illustration of a part of a user interface.

FIG. 4 shows an example in which the UI layer 214 of the client application 200 is configured to display a map with the call log entries plotted by latitude and longitude on the map itself. The map may be centred in dependence on the current location of the user terminal 102, and/or with the distance relative to the current location displayed on the map along with the corresponding entries.

Figure 5:
FIG. 5 is another illustration of a part of a user interface.

FIG. 5 shows an example in which the UI layer 214 of the client application 200 is configured to filter and/or sort communication events by site, e.g. based on whether calls were are made at home or a place of work, depending on the physical location of the user terminal 102 of the time of the event.

Thus the present invention advantageously links the physical location of the user terminal 102 to the logged communication events, allowing geographically relevant communication events to be more readily or efficiently identified. For example, the calls missed when the user terminal 102 was in the same vicinity as it is now could be more relevant that the most recent missed calls, for example the if the user wants to get back in touch with a contact who lives or works in the current neighbourhood.

In particularly preferred embodiments, the UI layer 214 is configured to present the user with controls allowing further communications to be established, with those controls being organised along with the log entries. Preferably each log entry has a corresponding control displayed in conjunction with that respective entry, which can be activated by mouse click, touch screen or selecting with a cursor. When activated, the control initiates a further communication with the contact or group of contacts involved in the previous logged event. So for example, having found that a certain call or other event was missed in the vicinity of the current location of his or her user terminal 102, a user may select that entry in the log an thereby initiate a further call. However, a less-preferred embodiment is not excluded in which the user must navigate the conventional menu system.

It will be appreciated that the above embodiments have been described only by way of example.

For instance, in a first alternative embodiment, it is not necessarily be the current location of the user terminal 102 that is used to organize the log. Alternatively, the location used to sort the events could be entered manually (although the captured locations would still be the detected locations at which the user terminal 102 was at the time of the respective events). For example, the user may remember the location but not the time at which a particular communication event occurred, e.g. having had a particularly memorable experience in the vicinity of a particular town such as Wokingham. The user may then manually key in a location, and the log may display a filtered list of communication events that occurred when the user terminal 102 was in that vicinity, or sort by proximity to that location.

In a second alternative embodiment, it need not be required to capture location of events at the user terminal 102 itself. Instead other user terminals 102 could be equipped with positioning systems, and could report their locations to the log of the user terminal 102. The log would then be organized based on the current detected location of the user terminal 102 relative to reported locations of other terminals 102 at times of events.

So in the first alternative embodiment, the captured location is detected by the positioning system whilst the current location is entered manually; whereas in the second alternative embodiment the current location is detected by the positioning system whilst the other locations are reported.

Furthermore, note that the additional functionality of the location-based logging mechanism need not necessarily be integrated into the same client application product as the main communication client 200. Alternatively a separate partner application could run in conjunction with the main client 200 on the operating system 208, and communicate relevant data therebetween.

Other variations of the present invention may be apparent to a person skilled in the art given the disclosure herein. The present invention is not limited by the described embodiments, but only by the appendant claims.

The invention is claimed is:

1. A user terminal comprising:
a positioning system arranged to detect a geographical location of said user terminal;
a transceiver for communicating with other user terminals via a communication network; and
a communication processing apparatus coupled to the transceiver and positioning system, arranged to detect communication events occurring via said transceiver and communication network in relation to other user terminals, and to maintain a log of said communication events;
wherein the communication processing apparatus is configured to perform operations including:
detecting a current geographical location of the user terminal based on geographical coordinates;
receiving user input at the user terminal defining a name for the current geographical location;
associating the user-defined name with the current geographical location to define the current geographical location as a user-defined location;
organizing said log in dependence on distances of the user terminal at the user-defined location from geographical locations for each of a plurality of the communication events; and
outputting a user interface that includes a visual identification of a respective distance between the user-defined location of the user terminal and the geographical location for each of the plurality of the communication events.

2. The user terminal of claim 1, wherein the communication processing apparatus is configured to generate an organized set of controls enabling further communication events to be initiated based on the organized log.

3. The user terminal of claim 1, wherein the communication processing apparatus is configured to organize said log in dependence on the current geographical location.

4. The user terminal of claim 1, wherein the communication processing apparatus is configured to capture a geographical location of said user terminal from the positioning system at a respective time of each of said communication events, and to organize said log in dependence on the captured geographical locations.

5. The user terminal of claim 1, wherein the communication processing apparatus is configured to capture a geographical location of said user terminal from the positioning system at a respective time of each of said communication events, and to organize said log in dependence on the captured geographical locations, and the communication processing apparatus is configured to organize said log in dependence on the current geographical location relative to the captured geographical locations.

6. The user terminal of claim 1, wherein said user terminal is a mobile user terminal.

7. The user terminal of claim of claim 1, wherein said communication events are in relation to other mobile user terminals.

8. The user terminal of claim 1, wherein said positioning system comprises a satellite-based positioning system.

9. The user terminal of claim 8, wherein said positioning system comprises a GPS receiver.

10. The user terminal of claim 1, wherein said transceiver is operable to communicate over a wireless cellular network comprising a plurality of cells each served by a corresponding base station, and the positioning system is configured to detect said current geographical location of the user terminal based on a location of at least one of said base stations.

11. The user terminal of claim 10, wherein the positioning system is configured to detect said current geographical location of the user terminal based on a triangulation performed using a plurality of said base stations.

12. The user terminal of claim 1 wherein said transceiver is operable to communicate over a packet-based network comprising a plurality of wireless access points, and the positioning system is configured to detect said current geographical location of the user terminal based on an identity of one of said wireless access points.

13. The user terminal of claim 1, wherein the communication processing apparatus is configured to determine a respective distance between the current location of said user terminal and a captured location of each of said communication events, and to organize the log in dependence on said distances.

14. The user terminal of claim 1, wherein the communication processing apparatus is configured to identify one of a plurality of predetermined sites based on said geographical location, and to organize the log in dependence on said identified site.

15. The user terminal of claim 1, wherein the transceiver is configured to communicate via the Internet, said communication events being via the Internet.

16. The user terminal of claim 1, wherein said communication events comprise at least one of a voice call, a video call, a missed call, a voicemail message, and an IM chat message.

17. A communication system comprising:
a user terminal comprising a transceiver for engaging in communication events over a communication network, wherein the user terminal is a mobile user terminal comprising a positioning system arranged to detect a geographical location of the user terminal, and the user terminal comprises a communication processing apparatus arranged to maintain a log of said communication events; and
wherein the communication processing apparatus is configured to perform operations including:
detecting a current geographical location of the user terminal based on geographical coordinates;
receiving user input at the user terminal defining a name for the current geographical location;
associating the user-defined name with the current geographical location to define the current geographical location as a user-defined location;
organizing said log in dependence on distances of the user terminal at the user-defined location from geographical locations for each of a plurality of the communication events; and
outputting a user interface that includes a visual identification of a respective distance between the user-defined location and the geographical location for each of the plurality of the communication events.

18. A method comprising:
detecting a current geographical location of a user terminal based on geographical coordinates;
receiving user input at the user terminal defining a name for the current geographical location;
associating the user-defined name with the current geographical location to define the current geographical location as a user-defined location;
detecting communication events occurring via the user terminal using a communication network;
maintaining a log of said communication events;
organizing said log in dependence on distances of the user terminal at the user-defined location from geographical locations for each of a plurality of the communication events; and
causing to be displayed a user interface that includes a visual identification of a respective distance between the user-defined location and the geographical location for each of the plurality of the communication events.

19. A computer program product comprising code embodied on a memory and configured so as to be executed on a user terminal to cause the user terminal to perform operations comprising:
detecting a current geographical location of said user terminal based on geographical coordinates;
receiving user input at the user terminal defining a name for the current geographical location;
storing the name for the current geographical location on the user terminal;
associating the user-defined name with the current geographical location to define the current geographical location as a user-defined location;
detecting communication events occurring via said user terminal at the user-defined location;
maintaining a log of said communication events;
organizing said log in dependence on distances of the user terminal at the user-defined location from geographical locations for each of a plurality of the communication events; and
outputting a user interface that includes a visual identification of a respective distance between the user-defined location and the geographical location for each of the plurality of communication events.

20. The computer-program product as recited in claim 19, wherein the user interface comprises one or more other user-defined locations, and lists one or more other communication events that occurred at the one or more other user-defined locations.

* * * * *